Dec. 30, 1969    P. CARPIGIANI    3,486,525
AUTOMATIC FEED DEVICE FOR CONTINUOUS
ICE CREAM MAKING MACHINES
Filed Jan. 2, 1968

INVENTOR
POERIO CARPIGIANI
BY
ATTORNEYS

United States Patent Office 3,486,525
Patented Dec. 30, 1969

3,486,525
AUTOMATIC FEED DEVICE FOR CONTINUOUS ICE CREAM MAKING MACHINES
Poerio Carpigiani, Bologna, Italy, assignor to APAW S.A., Fribourg, Switzerland, a joint-stock corporation of Switzerland
Filed Jan. 2, 1968, Ser. No. 695,233
Claims priority, application Italy, Jan. 2, 1967, 795,243/67
Int. Cl. F25c 7/08
U.S. Cl. 137—453                                    4 Claims

ABSTRACT OF THE DISCLOSURE

A continuous ice cream making machine provided with means for feeding by gravity the liquid to be frozen together with the air to be mixed therewith, wherein the liquid is poured from a capsized bottle into a basin or well mounted above the rear end of the horizontal mixing cylinder of the ice cream machine. The height of the mouth of the capsized bottles determines the maximum level of the liquid in the basin and this liquid is allowed to flow down into the rear end of the mixing cylinder each time this end, due to a corresponding dispensing of ice cream from the front end, has become empty.

---

Figures 1, 2:
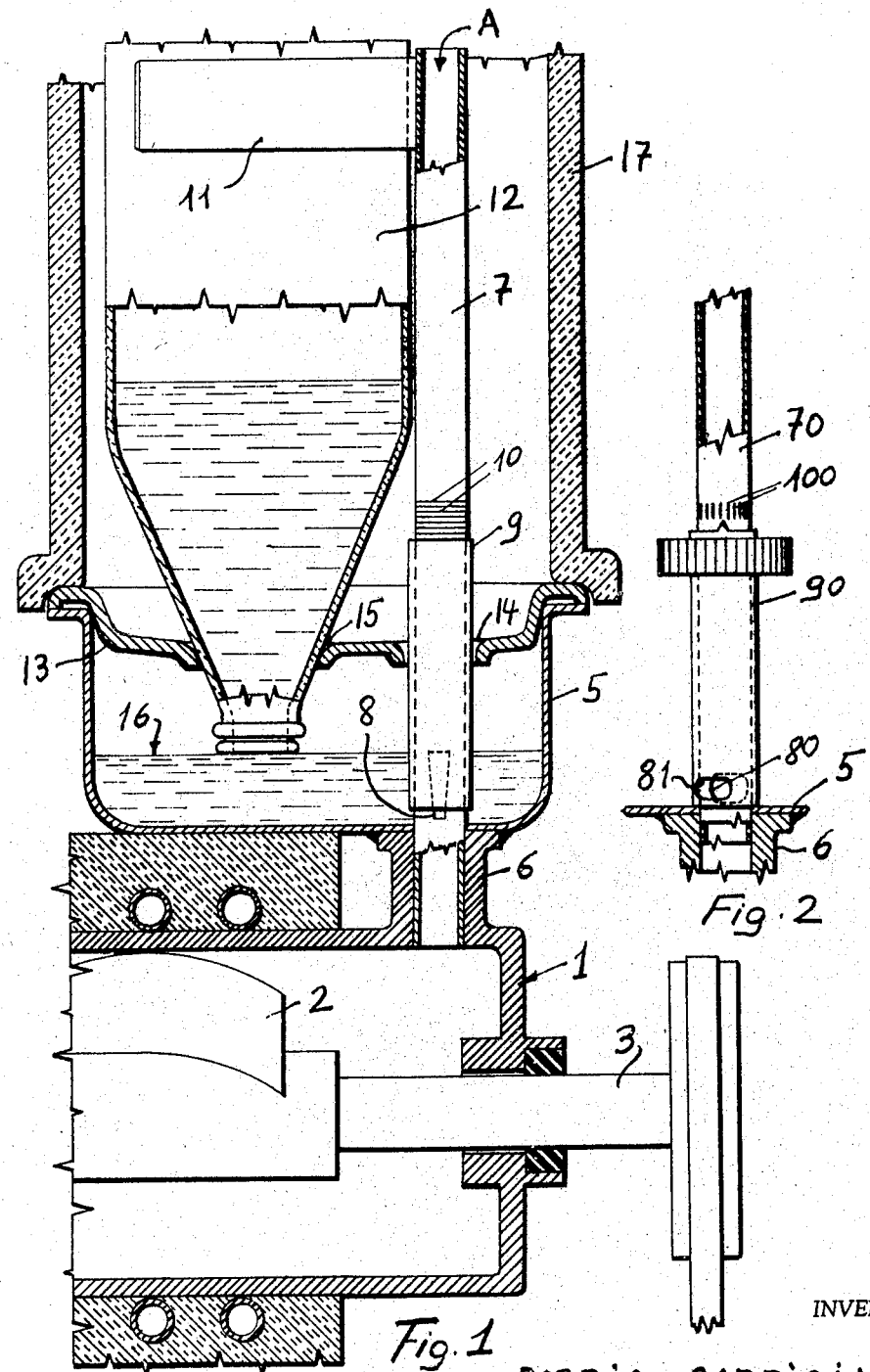

This invention relates to the automatic feed of the liquid mix and air into the horizontal mixing cylinder or chamber of continuous ice cream machines, and particularly to machines for the continuous manufacture and dispensing of the so-called soft ice.

In the known machines of this kind for the continuous feeding of the liquid ice cream mix and of a convenient amount of air to be intimately mixed therewith, two methods and devices are principally employed, viz.

(A) The pressure feed method, by which an emulsion of liquid mixture and air is previously prepared and fed into the mixing chamber, when required. The devices embodying this method require the use of additional devices, such as: pressure gauges, pumps, pipings and so on, which render the ice cream machine more costly and complicated and require constant control and upkeep.

(B) The gravity feed devices, which are much simpler but present mainly the inconvenience that the liquid column varies sensibly according to whether the liquid mix tank is more or less full, and in addition it is very difficult to feed, at the same time, with the liquid mix, a sufficient quantity of air to be emulsionated with the liquid mix, so as to form a "soft ice" of good quality.

This invention has for its object an improved device for automatically feeding by gravity always the necessary amount of liquid mix to be frozen and air to be emulsionated to the liquid mix so as to produce a constant-quality ice cream, in an amount which is practically equivalent to the quantity of dispensed ice cream.

Another object of the invention is to employ as reservoirs for the liquid mix conventional bottles or bottle-like containers, adapted to be stored sealed in a refrigerator, and to be inserted into the "magazine" of the ice cream machines without fully emptying same, whereby said bottles, besides acting as reservoirs, serve as means for maintaining a constant level in a basin-like well serving for feeding, when required, the liquid mix in the required amount into the mixing cylinder of the ice cream machine.

A further object of the invention is to provide means for allowing the outside air to flow into the mixing cylinder in a sufficient quantity, each time a certain amount of liquid mix is fed thereinto.

Other objects are to provide means for adjusting the passage area of the aperture from which the liquid is fed from the constant-level well or basin into the mixing chamber of the continuous ice cream making machine.

Other objects and advantages are to provide an improved automatic-feed continuous ice cream machine, which is very simple in its construction and easy to be cleaned, at the end of a working cycle.

The invention will be fully understood from the following specification of one perferred embodiment of same, and of two embodiments of the means for adjusting the flow of liquid being fed into the mixing chamber.

In the drawings, forming an integral part of the present specification:

FIGURE 1 is a vertical section through the rear part of a continuous ice cream making machine mixing cylinder provided with means for feeding thereinto the required amount of liquid mix and air, each time said rear part is empty; and FIGURE 2 is an elevation with parts in section showing an upright pipe for feeding liquid mix and air into the mixing cylinder, and showing a variation of the means for adjusting the passage area of the liquid inlet.

With reference to FIGURE 1, 1 denotes the heat-insulated and coil-refrigerated mixing cylinder of a continuous ice cream machine, in which a helical mixer 2 is mounted on a shaft 3 driven by means of a belt pulley.

The liquid mix to be frozen for producing the ice cream and the air to be emulsionated with the liquid are introduced from the rear end of the cylinder, through a duct 6. Upon this duct 6 and the adjoining insulation, a basin 5 is mounted, provided with a bottom hole which comes to be in line with the inlet of duct 6.

The basin 5 is provided with a lid 13 having a border by means of which it is supported by a peripheral flange of the basin 5. The lid has a hole 14 which may be brought in line with the bottom hole of the basin 5 and another wider central hole 15 adapted to hold by its neck a capsized bottle 12, with its mouth at a small distance from the basin bottom.

Into the hole of the basin bottom and the duct 6 an upright pipe 7 is tightly fitted, which extends with clearance through the hole 14 of the lid, well above the basin 5. The pipe 7 has a preferably wedge-shaped side opening 8 which, when the pipe is mounted with its lower end at level with the inner wall of the cylinder 1, extends from the bottom of the basin up to a certain distance from this bottom, which substantially corresponds to the level of the liquid 16 in the basin.

This level is determined and kept constant by fitting into the hole 15 a bottle 12 containing the mix to be frozen and maintained vertically capsized by a spring clamp 11 fastened to an extension of the pipe 7.

The pipe 7 has a flow passage area which is greater than the area of the wedge-shaped opening 8, so that when this opening is fully open and submersed under the liquid 16, this flows down the pipe 7 into the mixing cylinder 1, by leaving however a passage free for allowing sufficient air to flow from the top of said pipe 7 into the mixing cylinder 1, together with the liquid from basin 16.

On the other hand, the level of the liquid 16 in the basin is determined by the position of the mouth of the bottle 12 which, when still contains liquid, as soon as the level of the liquid 16 becomes lower as the mouth of the bottle, permits the air to flow into the basin 5, until the liquid level is again at the height of the bottle mouth, when the downflow of the liquid ceases, due to the impossibility of air penetrating into the bottle.

In order to adjust the downflow of the liquid through the opening 8, so as to possibly render same substantially equal to the rate of dispensing of ice cream at the outlet end of the mixing cylinder (not shown), the opening 8 is rendered adjustable by screwing on a corresponding part 10 of the pipe 7 a sleeve 9, so as to uncover a more or less large section of the opening 8.

In FIGURE 2 another embodiment of upright pipe 70 provided with adjustable inlet opening 80 is shown. This opening may be round and anyway needs not to be wedge-shaped and the sleeve 90 may be simply rotatably mounted upon said tube 70 and may be provided with an opening 81 which might be rotated so as to more or less correspond with the opening 80, so as to adjust at will the free flow area by rotating a handwheel provided with a hub having an index pointing to a graduation 100, indicating the amount of aperture of said opening 80.

From this foregoing, it is apparent that a device has been designed which, due to the substantially constant level of the liquid 16 in the basin 15, and to the means for adjusting the free flow area of the opening 8 or 80, permits of exactly regulating the rate of flow of the liquid mix into the mixing cylinder 1, each time the rear end of said cylinder becomes empty, due to the dispensing of ice cream from the front end (not shown) of the same cylinder.

It might be noted further that, when the mixing cylinder is full to the rear end, the lower end of the pipe 7 is also full of liquid and does not permit a further downflow both of liquid and air; when on the contrary some ice cream is dispensed from the front end of the cylinder, a corresponding volume of the cylinder rear end is emptied and permits the downflow first of the liquid in the lower end of the pipe 7 or 70 and then of a part of liquid from the basin 15 and of air A from the top of the upright tube.

It might be mentioned that, in order to avoid losses of cold, in use, the outstanding part of the bottle 12 may be covered by a bell 17 made of transparent insulating material. This permits also of observing when the bottle 12 is about to be empty and should be replaced by another bottle taken from the refrigerator or the store room.

The use of bottles as repleceable reservoirs of liquid for the manufacture of ice cream, besides realizing a constant level gravity feed device, permits of storing in sealed bottles a large quantity of liquid without the use of large reservoirs.

I claim:

1. A device for feeding the liquid mix and the air into the rear end of a mixing cylinder of a continuous ice cream machine, said device comprising a short vertical duct opening near the rear end of the ice cream machine mixing cylinder; a basin or well of limited capacity and provided with a bottom hole, fitted above said duct, with said bottom hole aligned with the inlet end of said duct; a cover or lid fitted above said basin and provided with a hole larger than, and in line with, said bottom hole and duct, and a substantially central aperture adapted to receive and hold the neck of a capsized bottle, filled with liquid to be frozen in said mixing cylinder and whose mouth extends a limited height above the basin bottom; an upright pipe inserted with a tight fit in said duct and basin bottom hole and above said lid hole, and provided with a side aperture extending just above the basin bottom, the whole being so arranged that when the bottle is held capsized in said central aperture, the liquid contained therein flows down into the said basin and into the underlying ice cream machine mixing cylinder until the liquid level in the basin reaches the bottle mouth and the duct comes to be filled with liquid from said basin, whereby when, due to ice cream dispensing, the rear part of the mixing cylinder is emptied, the liquid flows down from said basin into the mixing cylinder from the uncovered mouth of said capsized bottle liquid flows into the basin until the level in the basin reaches the bottle's mouth.

2. A device according to claim 1, wherein the side opening of said upright tube has a passage area that is smaller than the free flow area of said pipe, means being provided for further restricting at will the passage area of said side opening.

3. A device according to claim 2, wherein said side opening is wedge-shaped, with its lower end at level with the basin bottom and the means for restricting its flow area comprise a sleeve adjustable upon said upright pipe, so as to obstruct a part of said opening.

4. A device according to claim 2, in which the said upright pipe constitutes a supporting mean for a spring clamp adapted to hold said capsized bottles upright.

References Cited

UNITED STATES PATENTS

| | | | |
|---|---|---|---|
| 1,931,278 | 10/1933 | Wilkes | 137—453 X |
| 2,490,319 | 12/1949 | Palsgrove | 137—453 |
| 3,304,737 | 2/1967 | Strutynski | 62—306 X |
| 3,365,903 | 1/1968 | Lutz et al. | 62—306 X |

WILLIAM F. O'DEA, Primary Examiner

D. R. MATTHEWS, Assistant Examiner

U.S. Cl. X.R.

62—69, 188